(12) United States Patent
Toda

(10) Patent No.: US 6,512,595 B1
(45) Date of Patent: Jan. 28, 2003

(54) DATA PROCESSING APPARATUS, DATA PROCESSING METHOD, AND MEDIUM

(75) Inventor: Masanari Toda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/298,959

(22) Filed: Apr. 26, 1999

(30) Foreign Application Priority Data

Apr. 27, 1998 (JP) ............................................. 10-117314

(51) Int. Cl.⁷ ............................................... G06K 15/00
(52) U.S. Cl. ......................................... 358/1.9; 358/1.1
(58) Field of Search ........................... 358/1.1, 1.9, 1.2, 358/2.1, 3, 3.01, 536, 3.07, 3.08, 3.09, 451, 3.21; 382/254, 260, 263, 276, 298, 299, 300

(56) References Cited

U.S. PATENT DOCUMENTS 4,827,352 A  *  5/1989  Yoneda et al. ............. 358/3.07
5,243,441 A  *  9/1993  Kawata ...................... 358/3.07

* cited by examiner

*Primary Examiner*—Arthur G. Evans
(74) *Attorney, Agent, or Firm*—Fitzpatrick, Cella, Harper & Scinto

(57) ABSTRACT

A printer driver capable of converting color data into monochrome image data to be outputted to a high-quality monochrome image printer. Source data colors (red, green, blue) are converted by a printer driver to gray values using equation (1). A palette number which is closest to the obtained gray value is transferred to the system I/F. The system performs rendering by filling the rendering area with the palette number. When the data stored in the 8 bit-per-pixel (BPP) memory space in rendering process is transferred to the driver I/F, the printer driver performs binarization on the black value (8 bits) of the palette number.

18 Claims, 13 Drawing Sheets

FIG. 2

| PALETTE No. 601 | RED 602 | GREEN 603 | BLUE 604 | BLACK 605 |
|---|---|---|---|---|
| 0 | 0 | 0 | 0 | 255 |
| 1 | 64 | 0 | 0 | 254 |
| 2 | 128 | 0 | 0 | 253 |
| 3 | 192 | 0 | 0 | 252 |
| 4 | 255 | 0 | 0 | 251 |
| 5 | 0 | 64 | 0 | 216 |
| 6 | 64 | 64 | 0 | 215 |
| 7 | 128 | 64 | 0 | 214 |
| ... | | | | |
| 125 | 128 | 255 | 255 | 6 |
| 126 | 192 | 255 | 255 | 3 |
| 127 | 255 | 255 | 255 | 0 |
| 128 | 2 | 2 | 2 | 215 |
| 129 | 4 | 4 | 4 | 213 |
| 130 | 6 | 6 | 6 | 212 |
| ... | | | | |
| 249 | 244 | 244 | 244 | 9 |
| 250 | 246 | 246 | 246 | 8 |
| 251 | 248 | 248 | 248 | 6 |
| 252 | 250 | 250 | 250 | 4 |
| 253 | 252 | 252 | 252 | 3 |
| 254 | 254 | 254 | 254 | 1 |
| 255 | 255 | 255 | 255 | 0 |

606 COLOR PALETTE PORTION

607 MONOCHROME PALETTE PORTION

FIG. 12

| PALETTE No. 401 | RED 402 | GREEN 403 | BLUE 404 |
|---|---|---|---|
| 0 | 0 | 0 | 0 |
| 1 | 48 | 0 | 0 |
| 2 | 96 | 0 | 0 |
| 3 | 144 | 0 | 0 |
| 4 | 192 | 0 | 0 |
| 5 | 240 | 0 | 0 |
| 6 | 255 | 0 | 0 |
| 7 | 0 | 128 | 0 |
| 125 | 255 | 255 | 128 |
| 126 | 0 | 0 | 192 |
| 127 | 48 | 0 | 192 |
| 128 | 96 | 0 | 192 |
| 129 | 144 | 0 | 192 |
| 130 | 192 | 128 | 192 |
| 249 | 255 | 0 | 0 |
| 250 | 0 | 255 | 0 |
| 251 | 255 | 255 | 0 |
| 252 | 0 | 0 | 255 |
| 253 | 255 | 0 | 255 |
| 254 | 0 | 255 | 255 |
| 255 | 255 | 255 | 255 |

406 COLOR PALETTE PORTION

DATA PROCESSING APPARATUS, DATA PROCESSING METHOD, AND MEDIUM

BACKGROUND OF THE INVENTION

The present invention relates to a data processing apparatus and data processing method for converting color data into monochrome data to be outputted, and more particularly, to a controlling method of controlling a printer by utilizing a monochrome image printer driver for processing a printer control command transmitted from a host computer to a printer.

When a printer is connected to a host computer to output a print image, the host computer must have an interface corresponding to the printer. Recently computers generally include an OS (Operating System). In order to eliminate limitations of connectable types of printer, a printer driver is installed for each type of printers to maintain compatibility between the printer and OS.

Description will be provided, with reference to FIG. 10, on a printer driver for a conventional monochrome image printer which is connected to a host computer. FIG. 10 is a diagram explaining process of a general image driver.

The host computer includes an OS (Operating System) for controlling interface (I/F) between a device and an application program. The application program 201 and a printer driver exchange data through the API 202.

In a case where the application program 201 performs image rendering process for drawing a figure by combining an image, drawing, characters or the like, source image data, coordinates for strokes of the drawing, color information, character font information and so forth are transmitted to the printer driver through the API 202.

In the printer driver, an image processing module 203 performs image processing appropriate for the target printer device in accordance with the type of image and characters. The processed data is transferred to a renderer 204 of the printer driver for performing rendering process on a rendering plane 205 which serves as a memory space.

The rendering plane 205 may be provided for one page, or may be provided as a band memory where one page is divided into plural bands, in accordance with the memory size of the system and the number of tones in a bitmap image. After rendering is performed on the rendering plane 205, a rasterizer 206 converts the rendering data, rendered on the rendering plane 206, into monochrome image data in the form which can be transferred to an image printer 207. Then, the image is printed by the image printer 207.

The printer driver can set a bit per pixel (BPP) value for the rendering plane 205.

If an application program is started in the host computer and color image data is generated, data transmitted from the application program to the printer driver is color data. In the conventional technique, in order to accurately superimpose each color of an image, it is ideal to process the data in unit of 24 BPP (24 BPP: 1 pixel is expressed by R, G, B values each having 8 bits) as shown in the box indicated by reference numeral 208.

However in a monochrome 1 BPP printer, it is inefficient to use memory space for 24 BPP. Therefore, there are ways to set a rendering plane to 8 BPP (209), or 1 BPP (210).

Note that 8 BPP (bit per pixel) and 1 BPP (bit per pixel) indicate that the number of bits allocated to one pixel is 8 bits and 1 bit respectively. In the case of 8 BPP, values from 0 to 255 can be expressed. Normally, color component data each color having 8 bits is allocated to a palette code expressed by 8 BPP palette.

The conventional process of converting color image data into monochrome image data, using 24 BPP rendering plane, is now described in detail with reference to FIG. 11.

An object image rendered by the application program is transferred to a driver I/F 301 in unit of the object type (graphics 304, image 308). If the rendered object is graphics, the object data transferred to the driver I/F 301 includes coordinate data for a stroke representing a contour of the graphics, and R, G and B data indicative of a color of the contour or a color inside the graphics. If the rendered object is image data, color values of a source image are transferred to the printer driver 305 without being processed.

The printer driver 305 transfers the received data to the system I/F 302 without further processing. The system I/F 302 transfers the data to the rendering system 306 which performs rendering process in the 24 BPP band memory.

Upon completion of rendering all the objects in the 24 BPP band memory, the rendering system 306 transfers the head address of the band memory to the printer driver (rasterizer 307) through the driver I/F 303. The rasterizer 307 derives color values, pixel by pixel, from the head address of the band memory, and performs color conversion, monochrome conversion, binarization, and generate data to be transmitted to a printer.

Next, a conventional process using 8 BPP rendering plane is described in detail with reference to FIGS. 12 and 13. Only few monochrome printer drivers employ this method. However, this technique is generally used for displaying on a color display unit.

Reference numeral 406 in FIG. 12 denotes a color palette for outputting color data using 8 BPP rendering plane, based on color values transferred from the application program in the host computer.

Each of the palette numbers 401 is set by the three primary colors: red, green, and blue, each having respectively values (each color having 8 bits) to express various colors. Conventionally, each color changes at a constant rate as shown in FIG. 12 so that the colors are evenly distributed in the color space.

FIG. 13 shows a process of a monochrome printer driver using a conventional color palette as shown in FIG. 12 where each color is evenly distributed in the color space.

In the initial setting of the system, a color palette 501 (FIG. 13) is registered. An object rendered in the application program side is transferred to a driver I/F 502 in unit of the object type (graphics 506, image 511, character 512).

If the rendered object is graphics, the object data transferred to the driver I/F 502 includes coordinate data for a stroke representing a contour of the graphics, and R, G and B data indicative of a color of the contour or a color inside the graphics. If the rendered object is image data, color values of a source image are transferred to the printer driver 513 without being processed. Note that there is an operating system (OS) (e.g., Microsoft Windows NT 4.0) which designates the color of a character by using a color palette number registered in the system.

The printer driver 513 transfers the received data to the system I/F 503 without further processing. The system I/F 503 transfers the data to the rendering system 508 which performs rendering process in the 8 BPP band memory. The system searches for a palette number, and if the system finds an appropriate color in the color palette 501, rendering process is performed using the value in the color palette. If the system does not find an appropriate color in the palette 501, a color mixture pattern is generated with neighboring colors (dither process) and rendering process is performed.

Upon completion of rendering all the objects in the 8 BPP band memory, the rendering system 508 transfers the head address of the band memory to the printer driver (rasterizer 510) through the driver I/F 504. The rasterizer 510 derives color values, pixel by pixel, from the head address of the band memory, and performs color conversion, monochrome conversion, binarization, and generate data to be transmitted to a printer.

In monochrome image data generation, high image quality can be achieved if a 24 BPP rendering plane is used. However, using 24 BPP rendering plane requires a large memory capacity for the rendering area, and decreases speed because color conversion processing has to be performed on all pixels after rendering operation.

On the other hand, if a 1 BPP rendering plane or 8 BPP rendering plane is used, the process speed increases compared to the 24 BPP rendering plane, but the image quality is deteriorated because of the halftone process performed when the renderer 204 of the system expresses color data in 1 BPP or 8 BPP.

SUMMARY OF THE INVENTION

The present invention is made in consideration of the above situation, and has as its object to provide a data processing apparatus which solves the aforementioned problems.

Another object of the present invention is to provide a data processing apparatus capable of generating output data by converting color image data to monochrome image data and outputting a high-quality monochrome image without causing excessive data loss.

Another object of the present invention is to provide a data processing apparatus capable of outputting high-quality image at high speed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a table showing a color palette in an 8 BPP (bit per pixel) monochrome image driver according to the present embodiment;

FIG. 12 is a table showing a color palette in the conventional 8 BPP monochrome image driver.

DETAILED DESCRIPTION OF THE PREFERRED EMBODIMENTS

Preferred embodiments of the present invention will be described in detail in accordance with the accompanying drawings. In the following description, it is assumed that a monochrome image printer is connected to a host computer, and a monochrome image printer driver is installed in the host computer or the printer.

Note that in the following description, the printer driver is realized by a software program. However, the present invention is not limited to this example, but may be realized by hardware as a matter of course.

First Embodiment

Hereinafter, the first embodiment of the present invention is described using an example where a monochrome image printer is connected to a data processing apparatus. Now, a printer data generation method according to the first embodiment is described.

Figure 1:
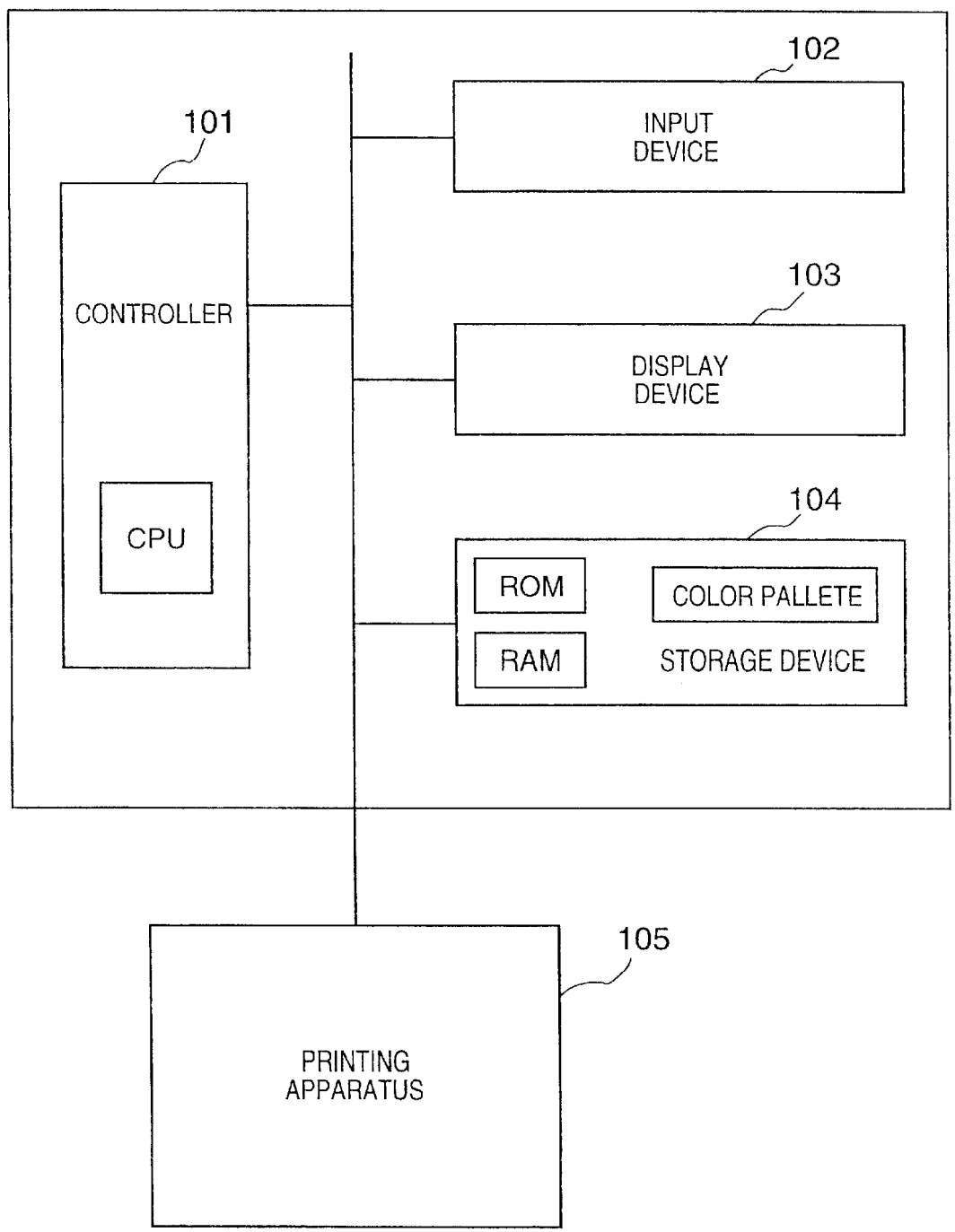
FIG. 1 is a block diagram showing a brief construction of a data processing system as an embodiment of the present invention.

FIG. 1 is a block diagram showing a construction of a data processing system according to the first embodiment. The data processing system according to the first embodiment is constructed by a data processing apparatus and a printing apparatus 105. The main portion of the data processing apparatus comprises a controller 101, an input device 102, a display device 103, and a storage device 104.

The controller 101 comprises a processor such as a CPU or the like, for controlling processes of each portion based on various control programs stored in the storage device including ROM, RAM or the like. Note that print data for the printing apparatus 105 is converted to a control command or the like by an operating system (OS) which controls the printer driver installed when the printing apparatus 105 is connected.

The printing apparatus 105 may be either a laser beam printer or an ink-jet printer. The present embodiment employs a monochrome printer having a monochrome image mode where image data in an output form is received and outputted.

FIG. 2 shows an example of a color palette used in the first embodiment. The color palette is stored in the storage device 104 in FIG. 1. The color palette includes palette numbers 601, red values 602, green values 603, blue values 604, and black values 605.

The black value (Black) is obtained and registered in the following manner. First, a gray value (luminance gray data) of a luminance level is calculated by equation (1), using red, green and blue values.

$$\text{Gray}=((\text{red}*77)+(\text{green}*151)+(\text{blue}*28))/256 \quad (1)$$

where * denotes multiplying.

Based on the obtained gray value (Gray), the density value (density gray data) is defined by equation (2).

$$\text{Black}=255-\text{Gray} \quad (2)$$

The registered color components include a color palette portion 606 and a monochrome palette portion 607 (color values resulting in a gray scale). In this example, 128 colors numbered from 0 to 127 are allocated to the color palette portion 606.

The color palette portion 606 consists of the color components, each changing at a predetermined rate.

128 tones numbered from 128 to 255 are allocated to the monochrome palette portion 607. In the monochrome palette portion 607, the following values (3), each color component incremented by two from the previous value, indicative of respective gray values are stored.

$$(\text{red, green, blue})=(2, 2, 2), (4, 4, 4), (6, 6, 6), \ldots ,(254, 254, 254), (255, 255, 255) \quad (3)$$

Figure 3:
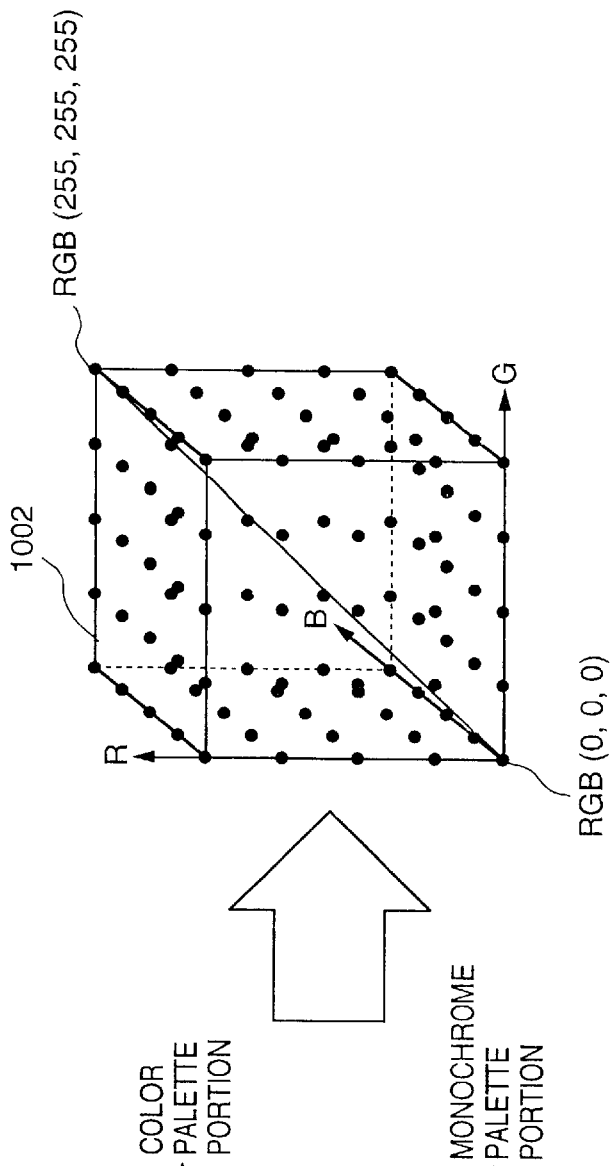
FIG. 3 is an explanatory view visually showing the distribution of color components in the color palette according to the present embodiment.

If the aforementioned color components are shown in an orthogonal R, G, B space, FIG. 3 is obtained. As shown in FIG. 3, the color portion is evenly distributed in the color space, and the gray portion connects (0, 0, 0) to (255, 255, 255).

Note that the color palette is not limited to having the above-described example, but any color palette can be used as long as the color palette comprises monochrome values having linear tones and color values evenly arranged in the color space.

Figure 4:
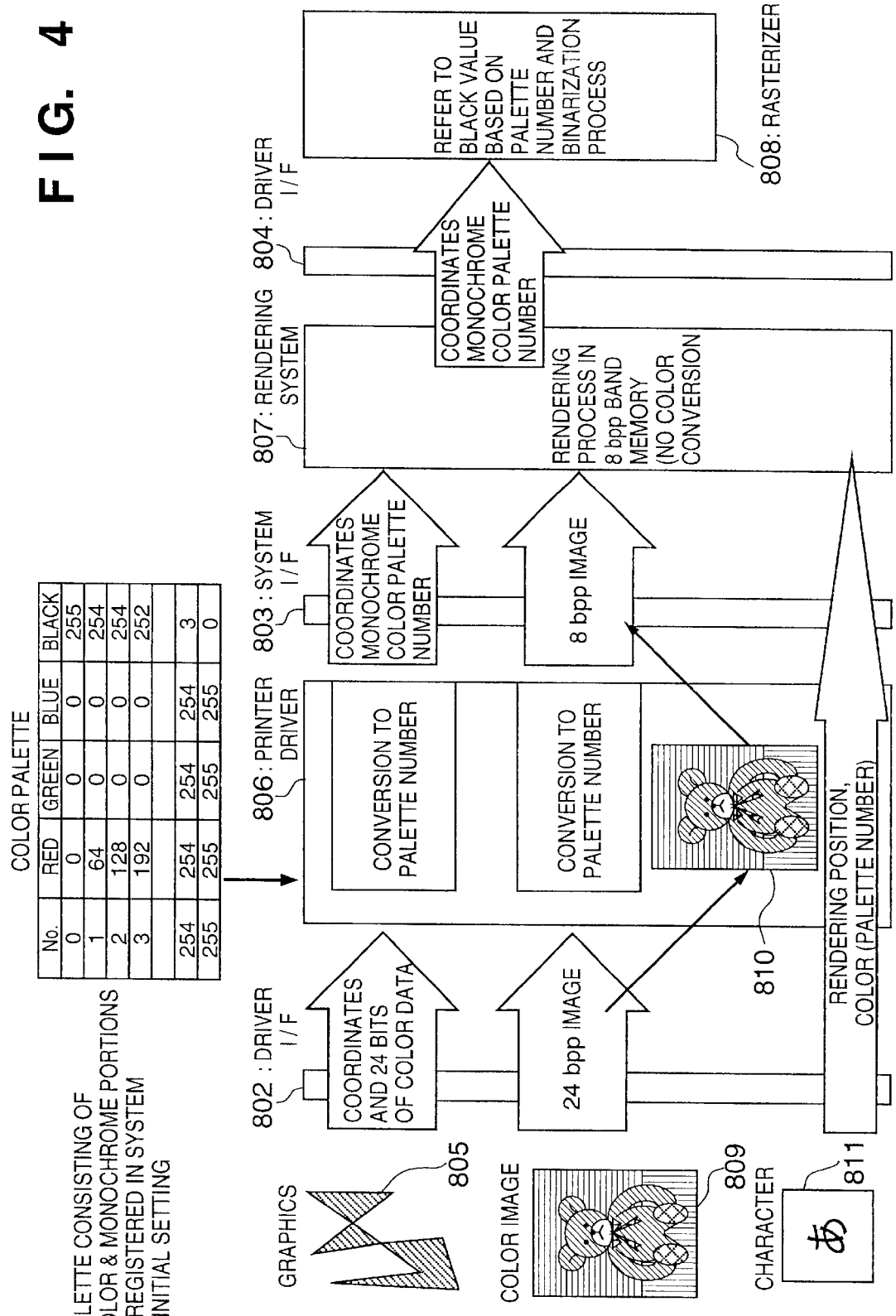
FIG. 4 is an explanatory view showing the process of the 8 BPP monochrome image driver according to the present embodiment.

Next, the method of processing print data according to the present embodiment is described with reference to the schematic view in FIG. 4. FIG. 4 is an explanatory view showing the process of 8 BPP (bit per pixel) monochrome image driver according to the present embodiment.

In the present embodiment, a color palette 801 is registered in the system in an initial setting of the 8 BPP monochrome image driver. Then, a color value obtained by performing color matching correction on each color of the color palette, is converted to a gray value by using equation (1). Then, a density value (Black value) is obtained by equation (2) using the obtained gray value, and registered in the color palette 801.

An object image rendered by an application program is transferred to a driver I/F 802 in unit of the object type (graphics 805, image 809, character 811). If the rendered object is graphics, the object data transferred to the driver I/F 802 includes coordinate data for a stroke representing a contour of the graphics, and R, G and B data indicative of a color of the contour or a color inside the graphics. If the rendered object is image data, color values of a source image are transferred to the printer driver 806 without being processed.

Note that there is an operating system (OS) (e.g., Microsoft Windows NT 4.0) which designates the color of a character by using a color palette number registered in the system. For those systems or application programs which designate a color by a palette number of a palette registered in the system, the color palette of the present embodiment must include a "color palette portion" having color values evenly distributed in the R, G and B space. By this, the system or application can find a close color with ease when searching for a necessary color in the palette.

Such "color palette portion" in the palette is advantageous in a case where bitmap data called a device dependent bitmap (DDB) is outputted to a printer as monochrome data.

Therefore, in the present embodiment, the printer driver 806 obtains a gray value using equation (1) based on the values in the color palette portion. A closest value to the obtained gray value is searched in the color palette 801, and an image rendering command or a graphics rendering command is generated using the obtained palette number, and transferred to a system I/F 803. Then, the rendering system 807 performs rendering process in the 8 BPP band memory. In the rendering process, the data is rendered in a designated bit map memory space in the storage device 104.

Since the object colors converted to gray values by the printer driver 806 always exist in the palette, the rendering system 807 can execute rendering process by using the designated gray values without further processing.

After the data is rendered in the 8 BPP band memory, printing is performed by the printing apparatus 105 in the following manner. First, the rendering system 807 transfers the head address of the band memory to a printer driver (rasterizer 808) through the driver I/F 804. The rasterizer 808 performs binarization process pixel by pixel (1 byte) on the values stored in the black value portion 605 of the color palette 801 and transfers the data to the printing apparatus 105.

Figure 5:
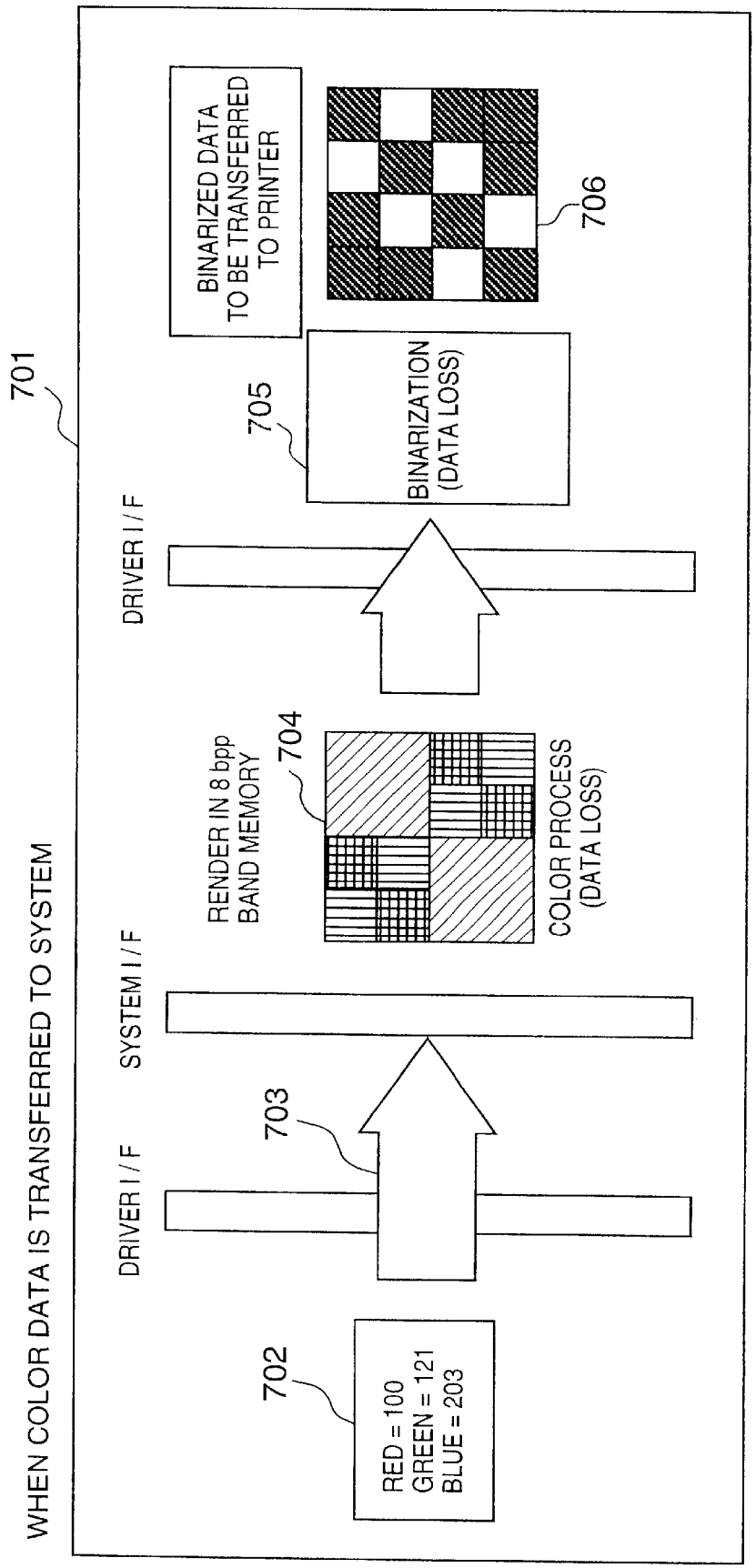
FIG. 5 is an explanatory diagram showing a printing process when color data is transferred to the system in a conventional 8 BPP mode.
Figure 6:
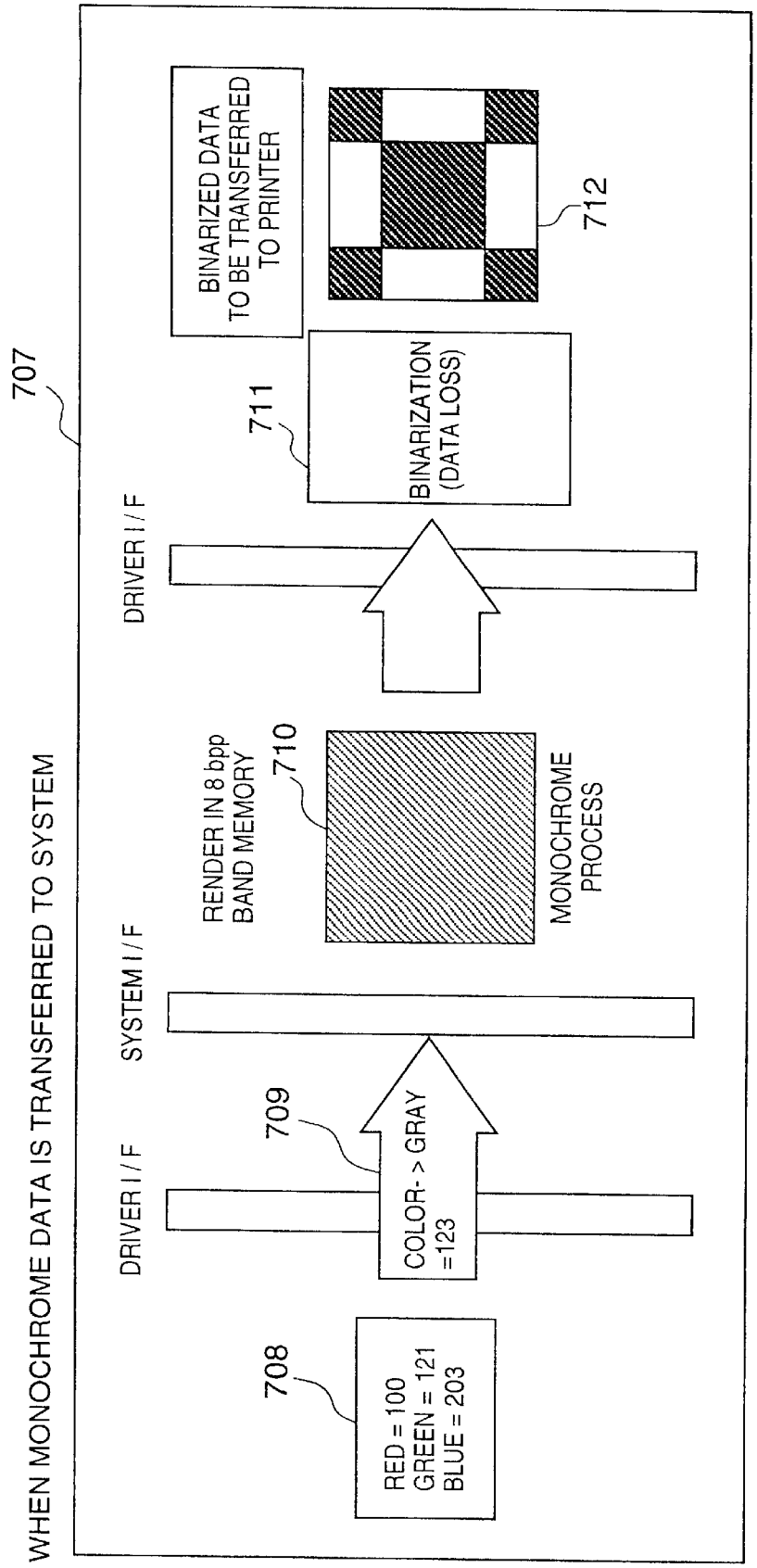
FIG. 6 is an explanatory diagram showing a printing process when monochrome data is transferred to the system in the 8 BPP mode of the present embodiment.

The principle of improving image quality in the process of 8 BPP monochrome image driver according to the present embodiment is described with reference to FIGS. 5 and 6. FIG. 5 is a diagram (701) showing a printing process when color data is transferred to the system. FIG. 6 is a diagram (707) showing a printing process when monochrome data is transferred to the system. FIG. 5 shows the conventional technique, while FIG. 6 shows the technique according to the present embodiment.

In FIG. 5, source data colors 702 (red, green, blue)=(100, 121, 203) are transferred to the system I/F without further processing as indicated by the arrow 703.

The system searches for the closest color value in the registered color palette. If an appropriate color is not found, closest palette colors are mixed in the rendering process so as to express the color in a wider area as indicated by reference numeral 704 in FIG. 5. However, even if the color can be expressed in a wider area, data loss occurs when seen in the pixel unit.

When the data stored in the 8 BPP memory space by the rendering process is transferred to the driver I/F, the printer driver 705 performs binarization on the black value (8 bits) of each color. Binarization process is a process for converting multivalued data to data in 1 BPP space. Density is expressed by the number of black dots in an area of 8×8 or 16×16. Dither methods and error diffusion methods are the widely known binarization.

In other words, data is lost in the process of color processing and binarization. Therefore, in the technique shown in FIG. 5, data loss occurs three times.

On the contrary, according to the technique of the present embodiment shown in FIG. 6, source data color 708 (red, green, blue)=(100, 121, 203) is converted from color data to gray data by using equation (1) by the printer driver as indicated by the arrow 709.

The closest color to the obtained gray data is searched in the color palette, and the palette number is transferred to the system I/F. Then, the rendering system performs rendering as indicated by reference numeral 710 by filling the rendering area with the transferred palette number.

When the data stored in the 8 BPP memory space by the rendering process is transferred to the driver I/F, the printer driver 711 performs binarization on the black value (8 bits) of each color. In other words, according to the foregoing technique of the present embodiment, data loss occurs only twice in the process of monochrome conversion and binarization process.

Furthermore, since the above process does not include any particularly complicated control, high speed process is possible.

Figure 7:
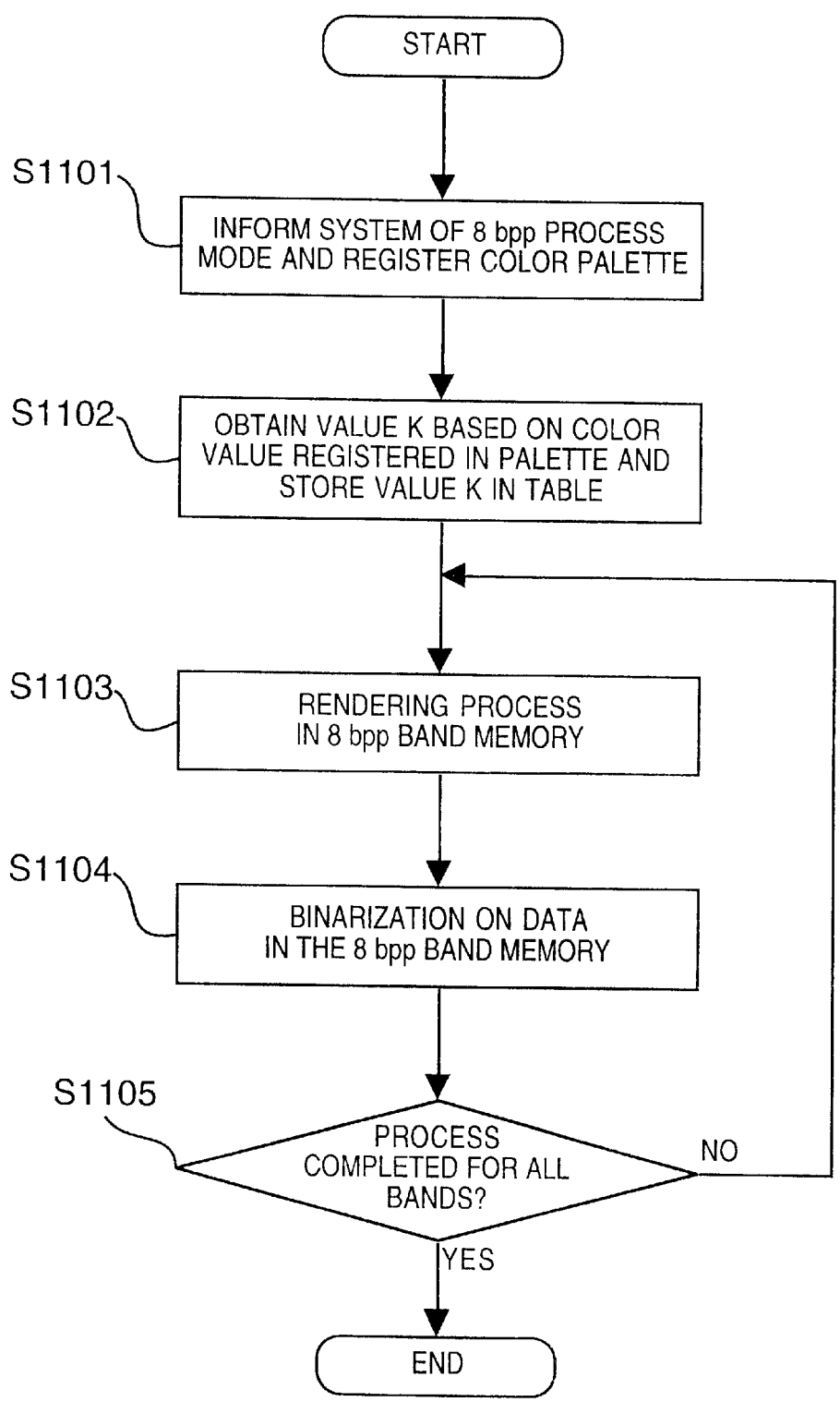
FIG. 7 is a flowchart showing an overall process of the present embodiment.

The overall process of the data processing apparatus according to the foregoing present embodiment will be described with reference to FIG. 7. FIG. 7 is a flowchart showing an overall process of the present embodiment. The process shown in FIG. 7 is executed by the control of the controller 101.

First in step S1101 in FIG. 7, the 8 BPP process mode of the printer driver is informed to the system and a color palette for the 8 BPP mode is registered in the system. In step S1102, designated color correction is performed on each of the color values registered in the color palette, and a value K (density value) is obtained by the aforementioned color-gray conversion. The obtained value K is stored in a table.

Next in step S1103, rendering process is performed in the 8 BPP band memory. In step S1104, binarization is performed on the data stored in the band memory which has been rendered in step S1103. In step S1105, it is determined whether or not generation of output data for all bands is completed. If generation of output data for all bands is not completed, the process returns to step S1103 and performs the process of generating output data for the next band.

Meanwhile, if the process of generating output data for all bands is completed in step S1105, the process ends. Then, the output data is transmitted to the printing apparatus 105 shown in FIG. 1 for printing process.

Figure 8:
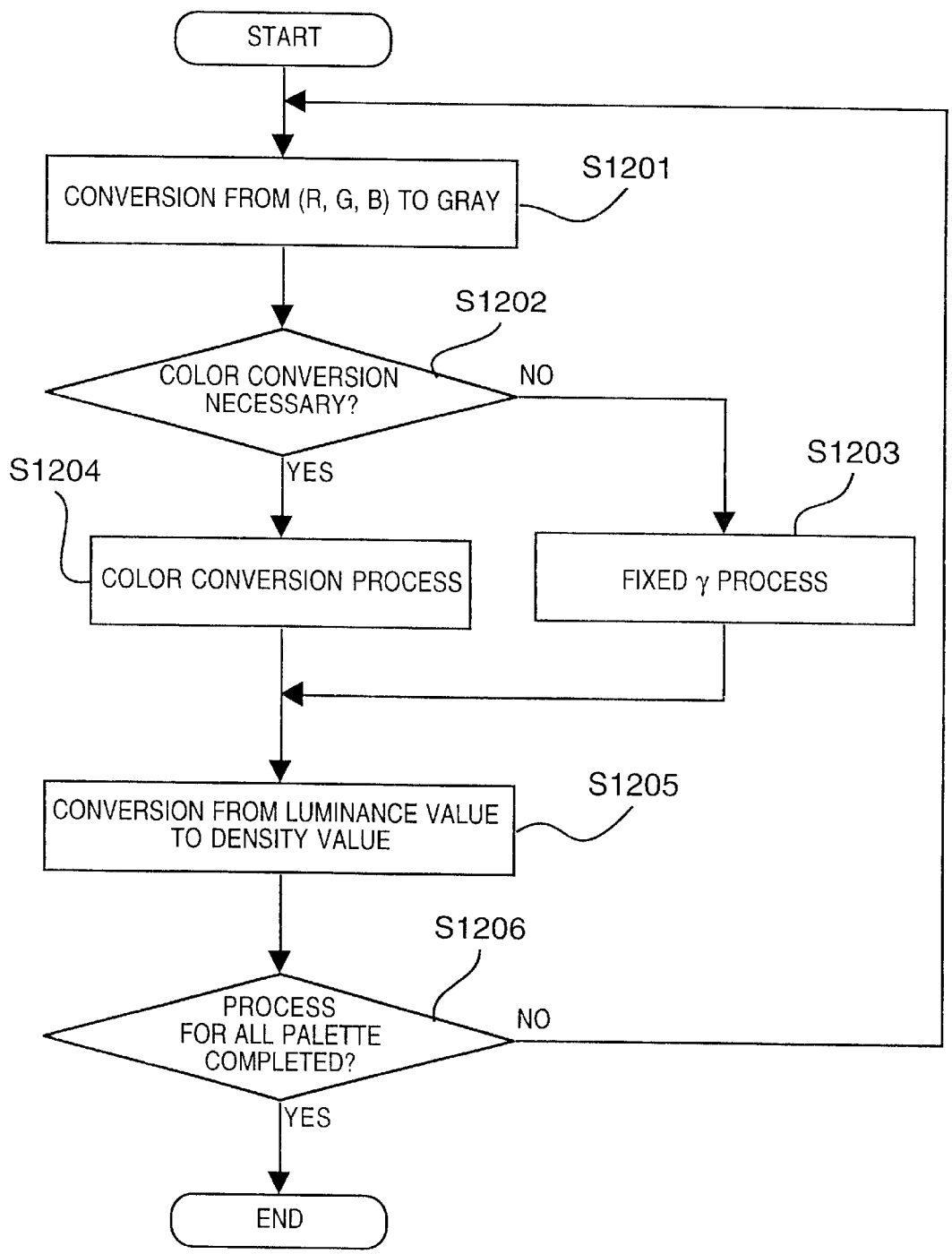
FIG. 8 is a flowchart showing detailed process of initializing a color palette shown in step S1102 in FIG. 7.

Next, the process (initializing process of color palette) of obtaining the value K from each color registered in the color palette in step S1102 is described with reference to the flowchart in FIG. 8.

In step S1201, a color value is converted to a monochrome value (color/gray conversion) by employing equation (1). In step S1202, it is determined whether or not a color conversion parameter is set for color conversion process. The color conversion process is a conversion process called color matching. If color conversion process is not necessary, the process proceeds to step S1203 where default γ process is performed, then fixed γ conversion process (R, G and B values to R, G and B values) is performed. Then, the process proceeds to step S1205.

Meanwhile, if color conversion process is necessary in step S1202, the process advances to step S1204 where color conversion (R, G and B values to R, G and B values) is performed according to a color conversion parameter. Then, the process advances to step S1205.

In step S1205, the luminance value is converted to a density value using equation (2). In step S1206, it is determined whether or not the process is completed for all the palettes. If the process is not completed for all the palettes, the process returns to step S1201 for processing the next palette.

Meanwhile, if the process is completed for all the palettes in step S1206, the process ends. Then, the process in step S1103 in FIG. 7 is executed.

The rendering process in 8 BPP band memory in step S1103 in FIG. 7 is described in detail with reference to the flowchart in FIG. 9.

In step S1301, 8 BPP memory space for the size of a source image is secured. In step S1302, it is determined whether or not the source image is expressed in an immediate value form (palette number) in which a pixel value itself has a color value.

If the source image is expressed in an immediate value form where the pixel value itself has a color value, the process proceeds to step S1303. Then, a gray value of each pixel is obtained by equation (1). The number of the color palette, registered in step S1101 in FIG. 7, which corresponds to the obtained gray value is stored in the memory space secured in step S1301. Then the process advances to step S1306.

Meanwhile in step S1302, if the source image is not expressed in a palette number, the process proceeds to step S1304 where a monochrome value for the color palette number of the source image is obtained by equation (1) and registered in a work table. In step S1305, by using the table generated in step S1304, the palette number of the gray value corresponding to the color palette registered in step S1101 in FIG. 7 is obtained for each pixel of the source image and stored in the memory space secured in step S1301. Then, the process advances to step S1306.

In step S1306, the monochrome data stored in the 8 BPP memory is transferred to the rendering system which performs image rendering process. In step S1307, the 8 BPP memory space secured in step S1301 is released.

Note that in the above-described embodiment, the monochrome value obtained by monochrome conversion is the closest gray value in the color palette 801. However, the present invention is not limited to this, and may use a second closest value.

As has been described above, the method of generating print data by the printer driver according to the present embodiment is controlled by a data control system, capable of processing data which is generated by rendering software operated in a data processing apparatus and rendering data in rendering bitmap space of a designated tone. The printer driver comprises: means for designating a tone in rendering bitmap space; means for registering a color palette table consisting of monochrome values having linear tones and color values evenly arranged in a color space; means for converting a color attribution value included in an image/graphics/character rendering command to a monochrome value; means for converting the monochrome value to a color palette number; and means for generating print data based on the color palette number and the image/graphics/character rendering command. By virtue of the above configuration, color image data is converted to monochrome data and transferred to a printer without causing excessive data loss and high quality printing is enabled.

Furthermore, a monochrome image printer driver capable of high-speed printing with high tonality can be achieved.

Still further, the aforementioned advantages can also be attained by having means for performing color conversion process on the values in the color palette table which is registered in the data control system by the printer driver; means for registering the converted values in association with the color palette table; means for performing the foregoing conversion process for the number of colors registered in the color palette, only at the time of starting a print job or at the time of changing color conversion parameters; and means for generating print data to be transferred to a printer by looking up a palette value which has been converted from a value in the bitmap space after rendering process.

Second Embodiment

In the above-described first embodiment, a color palette is constructed with a color palette portion having 128 colors and a monochrome palette portion having 128 tones. In a case where a dither pattern for binarization process employs an 8×8 matrix for 64 tones, the monochrome palette portion may be reduced to 64 tones and the color palette portion may have 192 colors to improve the color reproducibility of color characters.

Third Embodiment

In the first or second embodiment, the output form of a printer is a monochrome binary value. However, monochrome multi-values such as 2, 4 or 8 BPP may be employed.

Other Embodiments

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

In a case where the present invention is applied to the aforesaid storage medium, the storage medium stores program codes corresponding to the flowchart described in the embodiments.

As has been set forth above, according to the present invention, color image data can be converted to monochrome data and output data is generated. Therefore, it is possible to output a high quality image without losing excessive data. In addition, high-speed monochrome printing can be realized with high tonality.

The present invention is not limited to the above embodiments and various changes and modifications can be made within the spirit and scope of the present invention. Therefore, to appraise the public of the scope of the present invention, the following claims are made.

What is claimed is:

1. A data processing apparatus for having output data generation means perform rendering, said output data generation means rendering image data in a rendering bitmap space of a designated tone in a memory, comprising:

table registration means for registering a color palette table in said output data generation means, the color palette table including monochrome values having linear tones and color values evenly arranged in a color space;

first conversion means for receiving a rendering command from said output data generation means and converting a color attribution value included in the rendering command into a monochrome value;

second conversion means for converting the color attribution value by selecting a corresponding color palette number in the color palette table which is registered in accordance with the monochrome value obtained by said first conversion means; and rendering command output means for outputting a rendering command of the converted color attribution value to said output data generation means.

2. The data processing apparatus according to claim 1, wherein said output data generation means refers to the color palette table according to the rendering command of the color attribution value, outputted by said rendering command output means, to render the image data in the rendering bitmap space of the designated tone in the memory.

3. The data processing apparatus according to claim 1, further comprising tone designation means for designating a tone of the rendering bitmap space for said output data generation means, wherein said output data generation means renders image data with the tone, designated by said designation means, in the rendering bitmap space of the designated tone in the memory, by referring to the color palette table in accordance with the rendering command of the color attribution value outputted by said rendering command output means.

4. The data processing apparatus according to claim 1, further comprising:

third conversion means for performing color conversion on a value of the color palette table;

conversion value registration means for registering a conversion value, converted by said third conversion means, in association with the color palette table; and conversion process control means for performing the conversion process of said third conversion means for a number of colors registered in the color palette, only when an output process begins or when a color conversion parameter is updated, wherein said output data generation means generates output data by looking up the converted palette value based on a value in the bitmap space on which rendering process has been performed.

5. A data processing apparatus comprising:

first conversion means for converting inputted luminance color data to corresponding luminance gray data;

second conversion means for converting the luminance gray data, converted by said first conversion means to corresponding density gray data;

rendering means for rendering the density gray data converted by said second conversion means;

binarization means for binarizing the density gray data rendered by said rendering means; and output means for outputting the binary data, binarized by said binarization means, as monochrome image data.

6. The data processing apparatus according to claim 5, wherein said first conversion means converts the inputted luminance color data to a gray value representing a luminance level in accordance with Gray=((red*77)+(green*151)+(blue*28))/256.

7. The data processing apparatus according to claim 6, wherein said second conversion means converts the luminance gray data to density gray data in accordance with (Black=255−Gray).

8. A data processing method comprising the steps of:

converting inputted luminance color data to corresponding luminance gray data;

converting the luminance gray data to corresponding density gray data;

rendering the density gray data;

binarizing the rendered data; and outputting the binarized data as monochrome image data.

9. The data processing method according to claim 8, wherein in said step of converting the inputted luminance color data to luminance gray data, the inputted luminance color data is converted to a gray value representing a luminance level in accordance with Gray=((red*77)+(green*151)+(blue*28))/256.

10. The data processing method according to claim 9, wherein in said step of converting the luminance gray data to density gray data, the luminance gray data is converted to density gray data in accordance with (Black=255−Gray).

11. A data processing method for a data processing apparatus having a color palette table including monochrome values having linear tones and color values evenly arranged in a color space, comprising:

a table registration step of registering the color palette table;

a first conversion step of receiving a rendering command and converting a color attribution value included in the rendering command into a monochrome value;

a second conversion step of converting the color attribution value by selecting a corresponding color palette number in the color palette table which is registered in accordance with the monochrome value obtained in said first conversion step; and a rendering command output step of outputting a rendering command of the color attribution value which has been converted to the monochrome value.

12. The data processing method according to claim 11, further comprising an output data generation step of referring to the color palette table according to the rendering command of the color attribution value outputted in said rendering command output step, to render image data in a rendering bitmap space of a designated tone in a memory.

13. The data processing method according to claim 11, further comprising a tone designation step of designating a tone of the rendering bitmap space for said output data generation step, wherein in said output data generation step, image data is rendered with the tone, designated in said tone designation step, in the rendering bitmap space of the designated tone in the memory, by referring to the color palette table in accordance with the rendering command of the color attribution value outputted in said rendering command output step.

14. The data processing method according to claim 11, further comprising:

a third conversion step of performing color conversion on a value of the color palette table;

a conversion value registration step of registering a conversion value, converted in said third conversion step, in association with the color palette table; and a conversion process control step of performing the conversion process of said third conversion step for a number of colors registered in the color palette, only when an output process begins or when a color conversion parameter is updated, wherein in said output data generation step, output data is generated by looking up the converted palette value based on a value in the bitmap space on which rendering process has been performed.

15. The data processing apparatus according to claim 1, wherein 128 colors numbered from 0 to 127 are allocated to a color palette portion constructed by the color values in the color palette table.

16. The data processing apparatus according to claim 15, wherein the color palette portion is constructed by 128 colors changing at a predetermined rate.

17. The data processing apparatus according to claim 15, wherein 128 tones numbered from 128 to 255 are allocated to a monochrome palette portion constructed by the monochrome values in the color palette table.

18. The data processing apparatus according to claim 17, wherein in the monochrome palette portion, values each incremented by two, which indicate gray tones are stored.

* * * * *

UNITED STATES PATENT AND TRADEMARK OFFICE
CERTIFICATE OF CORRECTION

Figure 9:
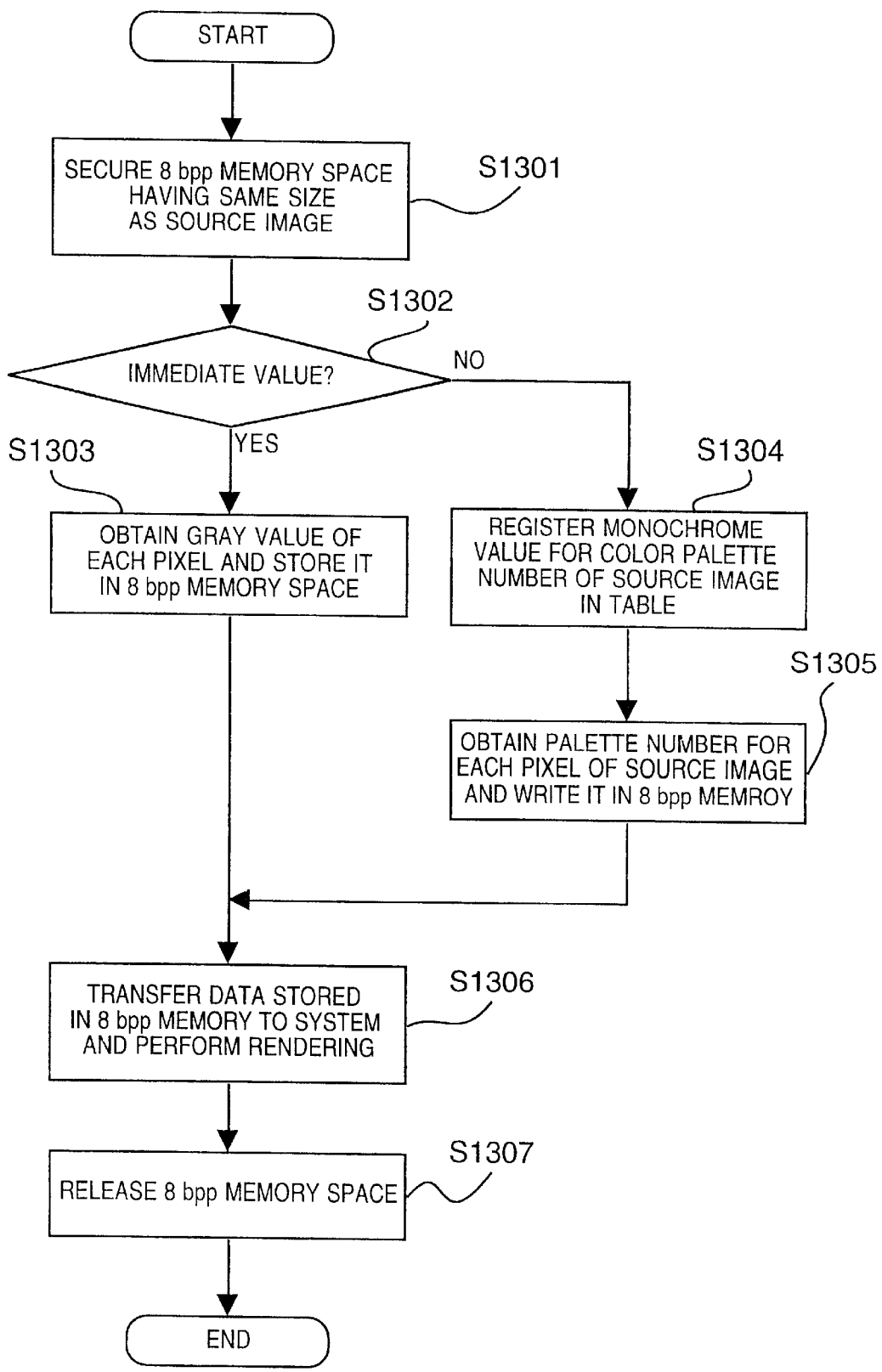
FIG. 9 is a flowchart showing detailed process of rendering data in the 8 BPP band memory shown in step S1103 in FIG. 7.
Figure 10:
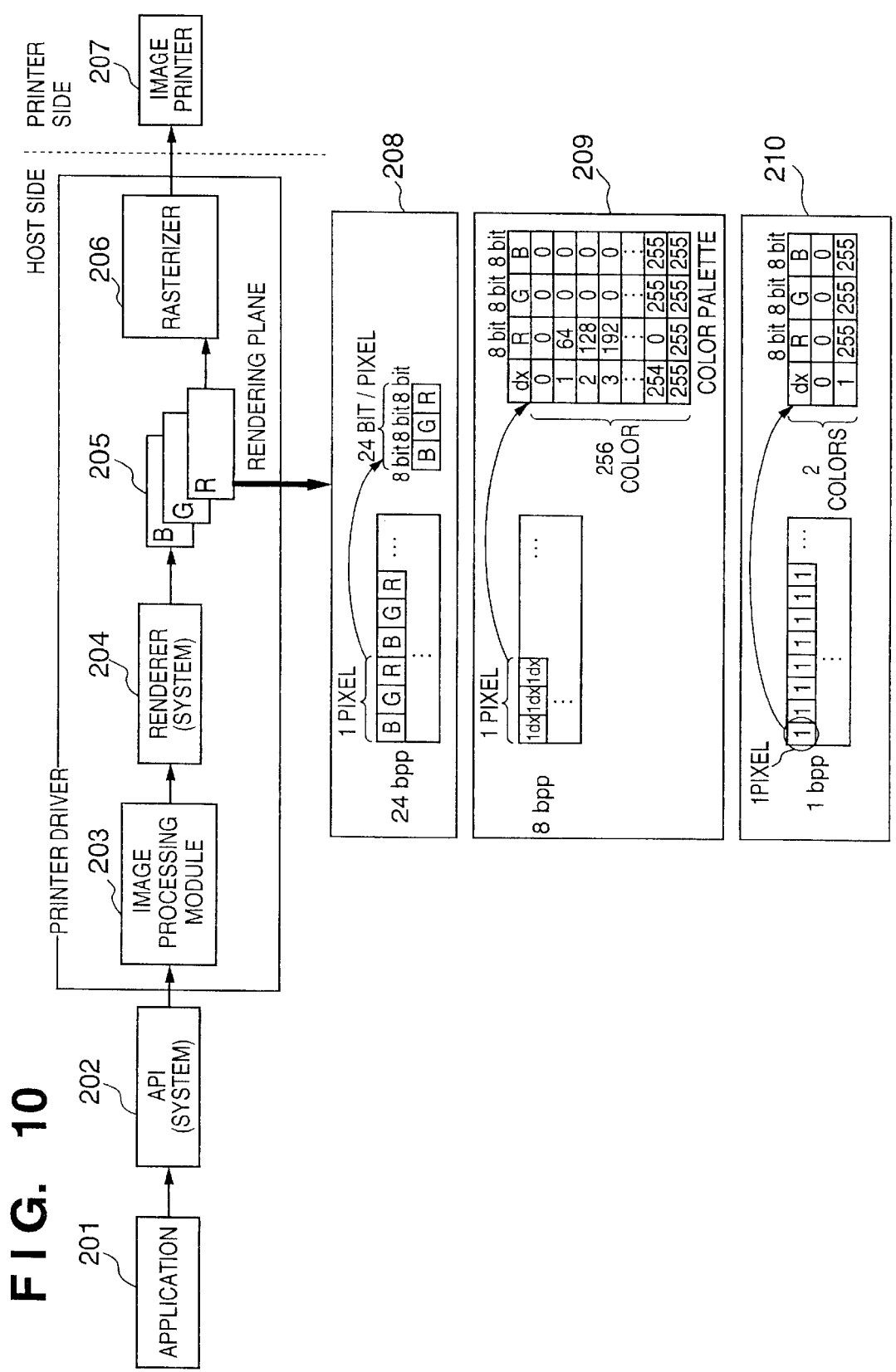
FIG. 10 is a diagram explaining process of a general image driver.
Figure 11:
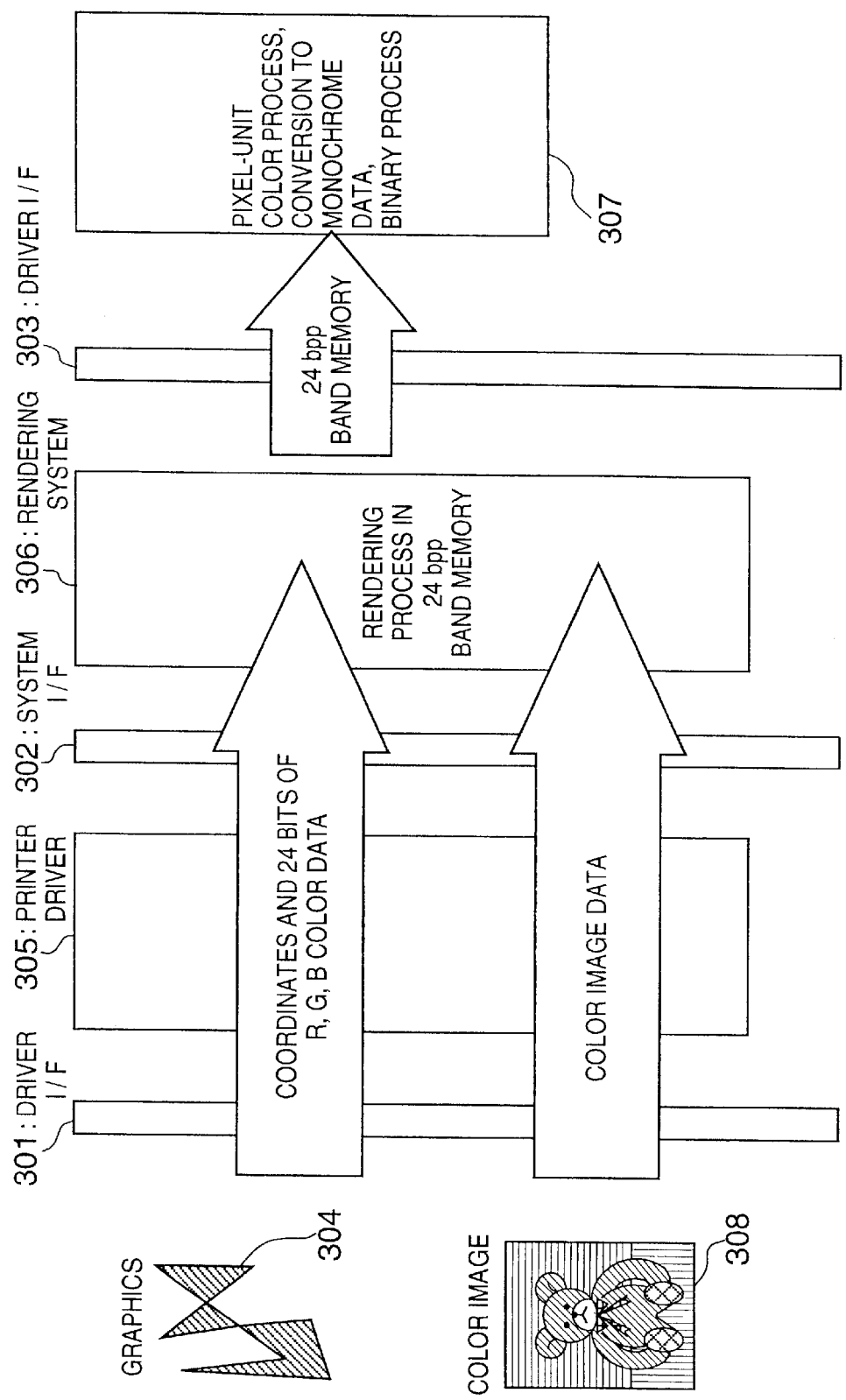
FIG. 11 is a diagram explaining process of a general 24 BPP monochrome image driver.
Figure 13:
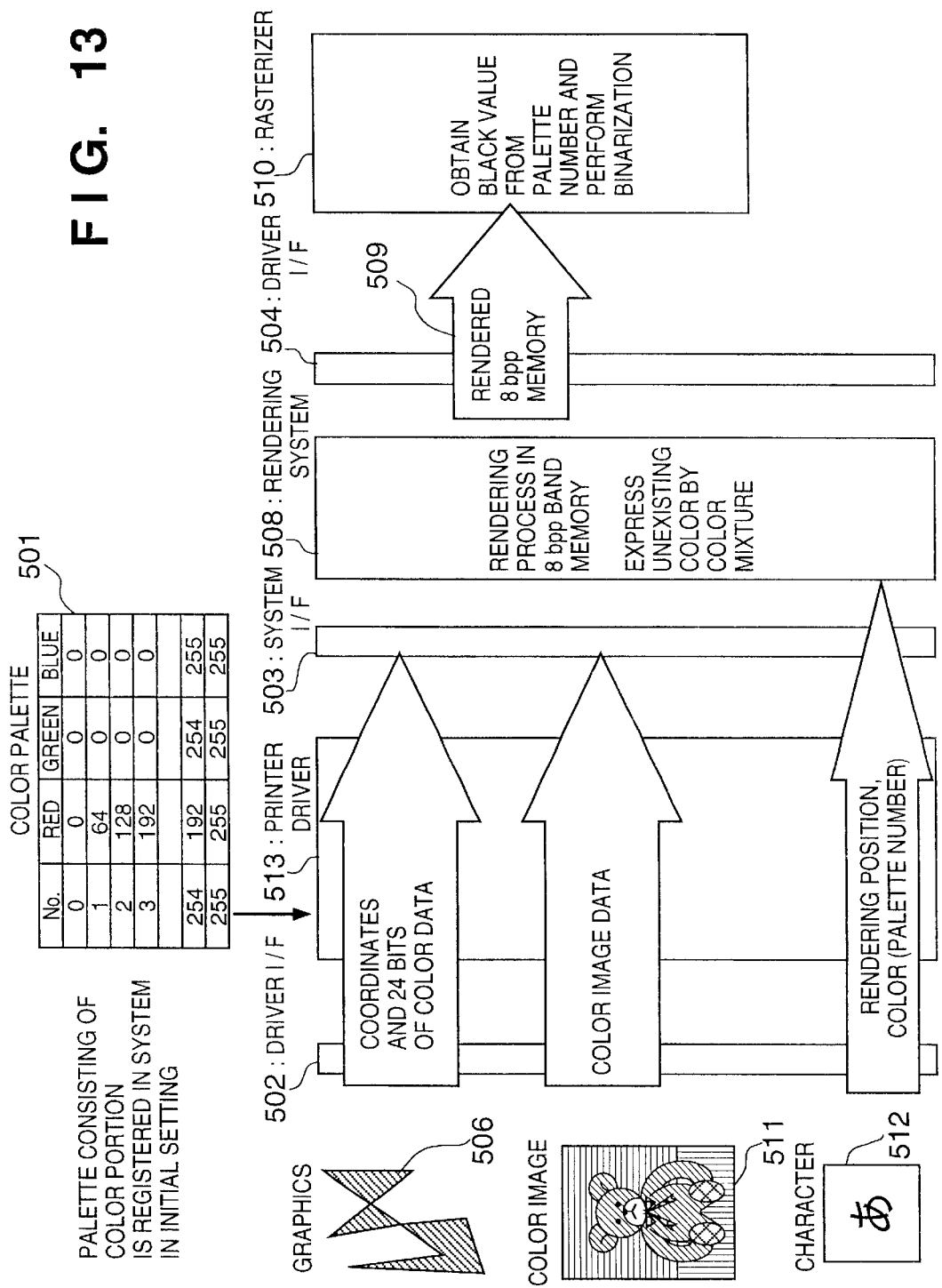
FIG. 13 is an explanatory view showing the process of the conventional 8 BPP monochrome image driver.

PATENT NO.    : 6,512,595 B1  
DATED         : January 28, 2003  
INVENTOR(S)   : Toda It is certified that error appears in the above-identified patent and that said Letters Patent is hereby corrected as shown below:

Drawings,
Sheet 9, Fig. 9, "MEMROY" in S1305 should read -- MEMORY --.

Column 6,
Line 45, "binarization.on" should read -- binarization on --.

Column 12,
Line 44, "tones" should read -- tones, --.

Signed and Sealed this

Eleventh Day of November, 2003

JAMES E. ROGAN  
*Director of the United States Patent and Trademark Office*